United States Patent
He et al.

(10) Patent No.: US 8,553,769 B2
(45) Date of Patent: Oct. 8, 2013

(54) METHOD AND DEVICE FOR IMPROVED MULTI-LAYER DATA COMPRESSION

(75) Inventors: Dake He, Waterloo (CA); Mingkai Shao, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 242 days.

(21) Appl. No.: 13/009,002

(22) Filed: Jan. 19, 2011

(65) Prior Publication Data

US 2012/0183056 A1  Jul. 19, 2012

(51) Int. Cl.
*H04B 1/66* (2006.01)

(52) U.S. Cl.
USPC ............. 375/240.12; 375/240.16; 375/240.19

(58) Field of Classification Search
USPC ........................................ 375/240.16, 240.19
See application file for complete search history.

(56) References Cited

U.S. PATENT DOCUMENTS

| | | | |
|---|---|---|---|
| 6,084,908 A | 7/2000 | Chiang et al. | |
| 2004/0202250 A1 | 10/2004 | Kong et al. | |
| 2006/0114999 A1* | 6/2006 | Han et al. | 375/240.19 |
| 2007/0217506 A1 | 9/2007 | Yang et al. | |
| 2007/0286283 A1* | 12/2007 | Yin et al. | 375/240.16 |
| 2011/0002391 A1* | 1/2011 | Uslubas et al. | 375/240.16 |

FOREIGN PATENT DOCUMENTS

| | | |
|---|---|---|
| EP | 2343900 | 7/2011 |
| WO | WO2010/127692 | 11/2010 |

OTHER PUBLICATIONS

Bo Shen et al: "Adaptive Motion-Vector Resampling for Compressed Video Downscaling", IEEE Transactions on Circuits and Systems for Video Technology, IEEE Service Center, Piscataway, NJ, US, vol. 9. No. 6, Sep. 1, 1999, p. 929.
Siu W C et al: "On the architecture of H.264 to H.264 homogeneous transcoding platform", Neural Networks and Signal Processing, 2008 International Conference on, IEEE, Piscataway, NJ, USA, Jun. 7, 2008, pp. 654-659.
Extended European Search Report dated Dec. 29, 2011, EP11151350.3.
ITU-T Recommendation H.264/ISO/IEC 14496-10 AVC, Advanced video coding for general audiovisual services, Nov. 2007, Annex G.
Bo Shen et al: "Adaptive Motion-Vector Resampling for Compressed Video Downscaling" IEEE Transactions on Circuits and Systems for Video Technology, vol. 9, No. 6, Sep. 1, 1999, XP011014612.
Siu W C et al: "On the architecture of H.264 to H.264 homogeneous transcoding platform" International Conference on Neural Networks and Signal Processing, Jun. 7, 2008, pp. 654-659, XP031298782.
Dogan S et al: "Chapter 6: Video Transcoding for Inter-network Communications" Apr. 25, 2002, Compressed Video Communications, John Wiley & Sons Ltd. pp. 215-256, XP007913926.
Wong J W C et al: "Predictive motion estimation for reduced-resolution video from high-resolution compressed video" Proceedings of the International Conference on Image Processing (ICIP), vol. 2, Oct. 4, 1998, pp. 461-464, XP010308639.

(Continued)

*Primary Examiner* — David Czekaj
*Assistant Examiner* — Tsion B Owens
(74) *Attorney, Agent, or Firm* — Rowand LLP

(57) ABSTRACT

An encoder and method for encoding data in a scalable data compression format are described. In particular, process for encoding spatially scalable video are described in which the base layer uses downscaled residuals from a full-resolution encoding of the video in its motion estimation process. The downscaled residuals may also be used in the coding mode selection process at the base layer.

15 Claims, 10 Drawing Sheets

(56) References Cited

OTHER PUBLICATIONS

H. Schwartz and T. Wiegand, Optimized Multi-Layer Encoder Control for SVC, San Antonio, TX, Sep. 2007.

M. Winken, et al., Joint Rate-Distortion Optimization of Transform Coeffecients for Spatial Scalable Video Coding Using SVC, San Diego, CA, Oct. 2008.

Huifeng Shen et al: "A Fast Downsizing Video Transcoder for H.264/AVC with Rate-Distortion Optimal Mode Decision" IEEE International Conference on Multimedia and Expo, Jul. 1, 2006, pp. 2017-2020, XP031033261.

Jia-Jun Bu et al: "Fast mode decision algorithm for spatial resolutions down-scaling transcoding to H.264" Journal of Zhejiang University—Science A, vol. 7, No. 1, Apr. 27, 2006, pp. 70-75, XP019385075.

Juaying Liu, et al., Bit Allocation for Spatial Scalability in H.264, Multimedia Signal Processing, 2008, IEEE.

Jan De Cock et al: "Dyadic spatial resolution reduction transcoding for H. 264/AVC" Multimedia Systems, Springer, Berlin, DE, vol. 16, No. 2, Jan. 7, 2010, pp. 139-149, XP0198804325.

En-Hui Yang et al: "Rate Distortion Optimization for H. 264 Interframe Coding: A General Framework and Algorithms" IEEE Transactions on Image Processing, IEEE Service Center, Piscataway, NJ, US LNKD-DOI:10.1109/TIP.2007, 896685, vol. 16, No. 7, Jul. 1, 2007, pp. 1774-1784, XP011185448.

Christopoulos C et al: Video transcoding architectures and techniques: an overview IEEE Signal Processing Magazine, IEEE Service Center, Piscataway, NJ, US LNKD-DOI:10, 1109/MSP, 2003, 1184336, vol. 20, No. 2, Mar. 1, 2003, pp. 18-29, XP011095789.

Ligang Lu et al: "Adaptive frame prediction for foveation scalable video coding" Proceedings of the International Conference on Multimedia and Expo (ICME), Aug. 22, 2001, pp. 705-708, XP010661935.

Sullivan G J et al: "Rate-Distortion Optimization for Video Compression" IEEE Signal Processing Magazine, IEEE Service Center, Piscataway, NJ, US LNKD-DOI:10.1109/79.733497, vol. 15, No. 6, Nov. 1, 1998, pp. 74-90, XP011089821.

\* cited by examiner

"Akiyo" Base Layer

"Akiyo" Enhancement Layer

"Foreman" Base Layer

"Foreman" Enhancement Layer

METHOD AND DEVICE FOR IMPROVED MULTI-LAYER DATA COMPRESSION

FIELD

The present application generally relates to data compression and, in particular, to improvements to multi-layer data compression.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU: High Efficiency Video Coding (HEVC).

There are a number of standards for encoding/decoding images and videos, including H.264, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC will also have these features.

Some of the standards provide for scalable multi-layer data compression. For example, H.264/SVC (Scalable Video Coding) defines the format for encoding video in multiple layers such that one or more parts of the resulting bitstream (i.e. a sub stream) provide a valid decidable lower resolution version of the video data. Different layers may be scaled spatially, temporally, or by a quality measure. By way of illustration, H.264/SVC provides the capability of encoding a base layer at a lower spatial resolution (i.e. a downscaled version of the video) and an enhancement layer at a higher spatial resolution. More than two layers may be present in some bitstreams. Particular devices or applications may want to use only the base layer of a scalable encoded video, perhaps due to a screen size limitation, bandwidth limitation, latency requirements, etc. Scalable video coding finds particular application in video conferencing, video streaming, mobile video, and other such applications.

A problem with scalable video coding is that the rate-distortion performance of the enhancement layer usually falls short of what would otherwise be achieved through regular H.264/AVC encoding. Attempts to improve SVC performance often trade-off base layer performance for improved enhancement layer rate-distortion performance.

It would be advantageous to provide for further improved encoders and methods or processes for scalable encoding.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
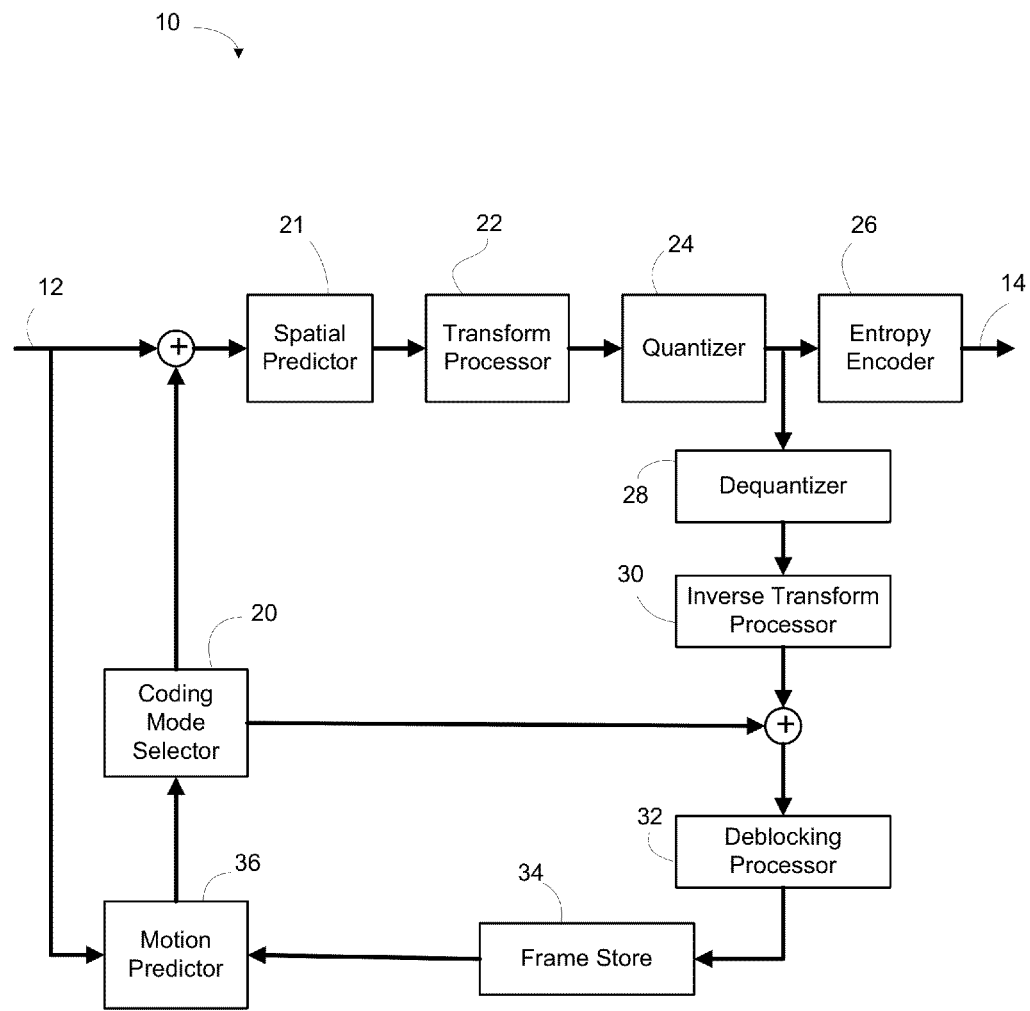
FIG. 1 shows, in block diagram form, an encoder for encoding video.

In one aspect, the present application describes a method of encoding an input video to create an encoded video in a scalable video format, wherein the input video includes full-resolution frames, wherein the scalable video format includes an encoded base layer video at a spatially downsampled base layer resolution and an encoded enhancement layer video at a higher resolution. The method includes obtaining full-resolution residual values for the full-resolution frames; spatially downsampling the full-resolution residual values to the base layer resolution to generate downsampled residuals; spatially downsampling the input video to create a base layer video at the base layer resolution; encoding the base layer video using a motion estimation process that employs a motion estimation rate-distortion optimization expression that includes the downsampled residuals to produce the encoded base layer video; encoding an enhancement layer video at the higher resolution using a scalable video coding process to produce the encoded enhancement layer video; and combining the encoded base layer video and encoded enhancement layer video to produce a bitstream of encoded video.

In another aspect, the present application describes an encoder having a processor, memory and an encoding application, which when executed configures the processor to perform one or more of the methods and processes described herein.

In another aspect, the present application describes a computer-readable medium storing computer-executable instructions that, when executed, configure a processor to perform one or more of the methods described herein.

In yet another aspect, the present application is directed to a non-transitory computer-readable medium having stored thereon the bitstream of encoded video produced by one or more of the method described herein.

Other aspects and features of the present application will be understood by those of ordinary skill in the art from a review of the following description of examples in conjunction with the accompanying figures.

In the description that follows, some example embodiments are described with reference to the H.264 standard for video coding. Those ordinarily skilled in the art will understand that the present application is not limited to H.264 but may be applicable to other video coding/decoding standards, including possible future standards, such as HEVC. It will also be appreciated that the present application is not necessarily limited to video coding/decoding and may be applicable to audio coding/decoding, image coding/decoding, or the lossy coding/decoding of any other data. The present application is broadly applicable to any lossy data compression process that employs multi-layer data compression, in which the subject data is encoded in two or more layers of differing quality or resolution, irrespective of the type of data being coded/decoded. For example, in addition to being applicable to scalable video coding, such as that described in H.264/SVC, it may further be applicable to multi-view video coding, such as that described in H.264/MVC.

In the description that follows, when referring to video or images the terms frame and slice may be used somewhat interchangeably. Those of skill in the art will appreciate that, in the case of the H.264 standard, a frame may contain one or more slices. It will also be appreciated that certain encoding/decoding operations are performed on a frame-by-frame basis and some are performed on a slice-by-slice basis, depending on the particular requirements of the applicable image or video coding standard. In any particular embodiment, the applicable image or video coding standard may determine whether the operations described below are performed in connection with frames and/or slices, as the case may be. Accordingly, those ordinarily skilled in the art will understand, in light of the present disclosure, whether particular operations or processes described herein and particular references to frames, slices, or both are applicable to frames, slices, or both for a given embodiment.

To the extent that the processes or methods described below are applied to images and/or video they may be applied on a block-basis, a coding-unit-basis, a slice-basis, a frame-basis, a Group-of-Pictures (GOP) basis, or otherwise, as will be appreciated by those ordinarily skilled in the art after a full review of the following description. A coding unit may be any block or group of blocks prescribed by the applicable standard as the basic coding unit; for example, the coding unit in H.264/AVC is a 16×16 macroblock. HEVC may specify one or more coding units; the size of the coding unit may vary in some implementations and, in some cases, a frame or image may include more than one type/size of coding unit. To the extent that the process or methods described herein are applied to audio, such as music or voice data, they may be applied to a grouping or sequence of data points, e.g. an audio sample.

Figure 2:
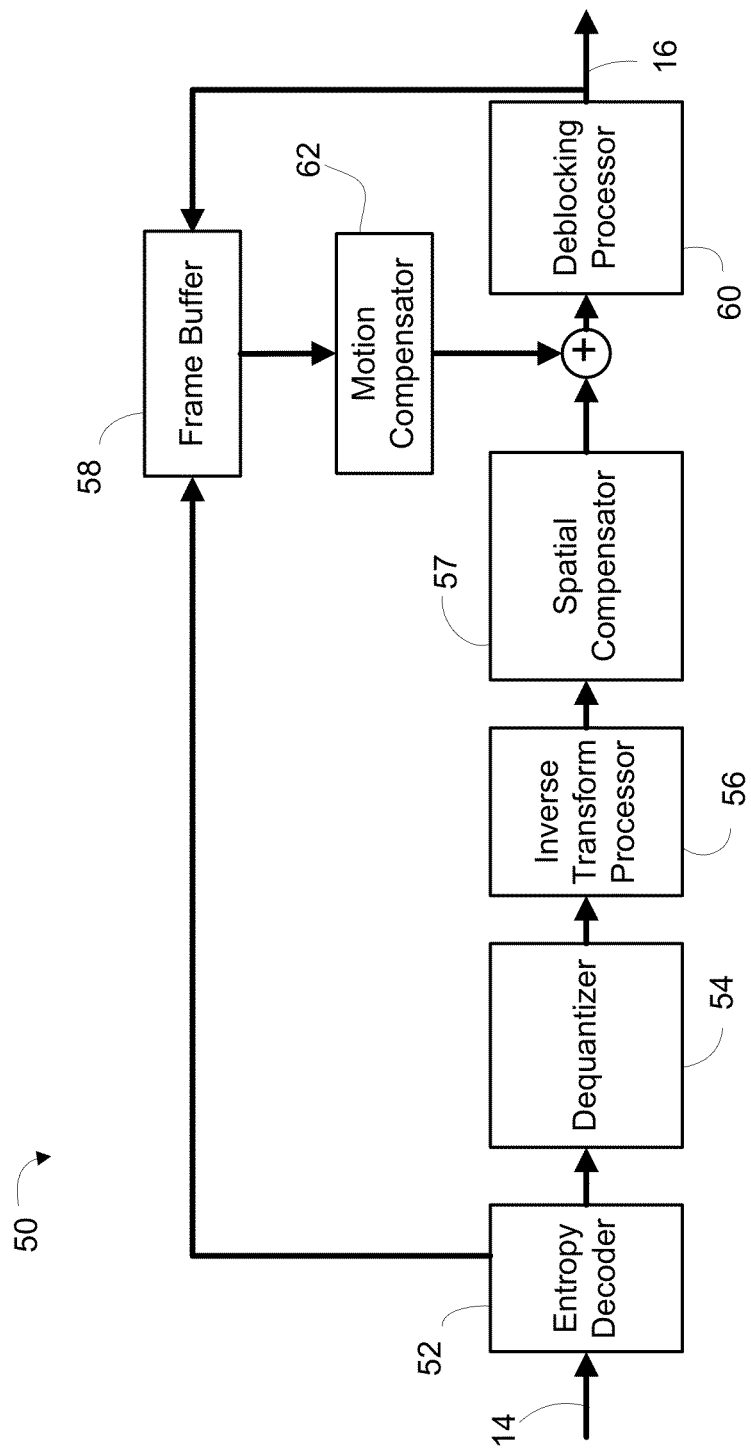
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, such as HEVC.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular macroblocks or coding units within the frame/slice are inter or intra coded. The transform processor 22 performs a transform upon the pixel domain data. In particular, the transform processor 22 applies a block-based transform to convert pixel domain data to spectral components. For example, in many embodiments a discrete cosine transform (DCT) is used. Other transforms, such as a discrete sine transform or others may be used in some instances. The block-based transform is performed on a coding unit or sub-coding-unit basis, depending on the size of the coding units. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/ slices stored in the frame store 34 as source frames/slices for comparison to a current frame for the purpose of identifying similar blocks. Accordingly, for macroblocks to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the prediction (reference block) and the current block. Information regarding the reference frame and/or motion vector might not be processed by the transform processor 22 and/or quantizer 24, and instead may be supplied to the entropy encoder 26 for encoding as part of the bitstream along with the quantized coefficients.

Those ordinarily skilled in the art will appreciate the details and possible variations for implementing H.264 encoders.

The decoder 50 includes an entropy decoder 52, dequantizer 54, inverse transform processor 56, spatial compensator 57, and deblocking processor 60. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the pixel domain "video data". It will be appreciated that, in some cases, such as with an intra-coded macroblock, the recreated "video data" is the residual data for use in spatial compensation relative to a previously decoded block within the frame. The spatial compensator 57 generates the video data from the residual data and reconstructed pixel data from a previously decoded block. In other cases, such as inter-coded macroblocks, the recreated "video data" from the inverse transform processor 56 is the residual data for use in motion compensation relative to a reconstructed reference block from a different frame. Both spatial and motion compensation may be referred to herein as "prediction operations".

The motion compensator 62 locates a reference block within the frame buffer 58 specified for a particular inter-coded macroblock. It does so based on the reference frame information and motion vector specified for the inter-coded macroblock. It then supplies the reference block pixel data for combination with the residual data to arrive at the reconstructed video data for that macroblock.

A deblocking process may then be applied to a reconstructed frame/slice, as indicated by the deblocking processor 60. After deblocking, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device. In some instances, other post-processing filter operations may be applied to the pixel domain data before being output.

It is expected that HEVC-compliant encoders and decoders will have many of these same features.

Figure 3:
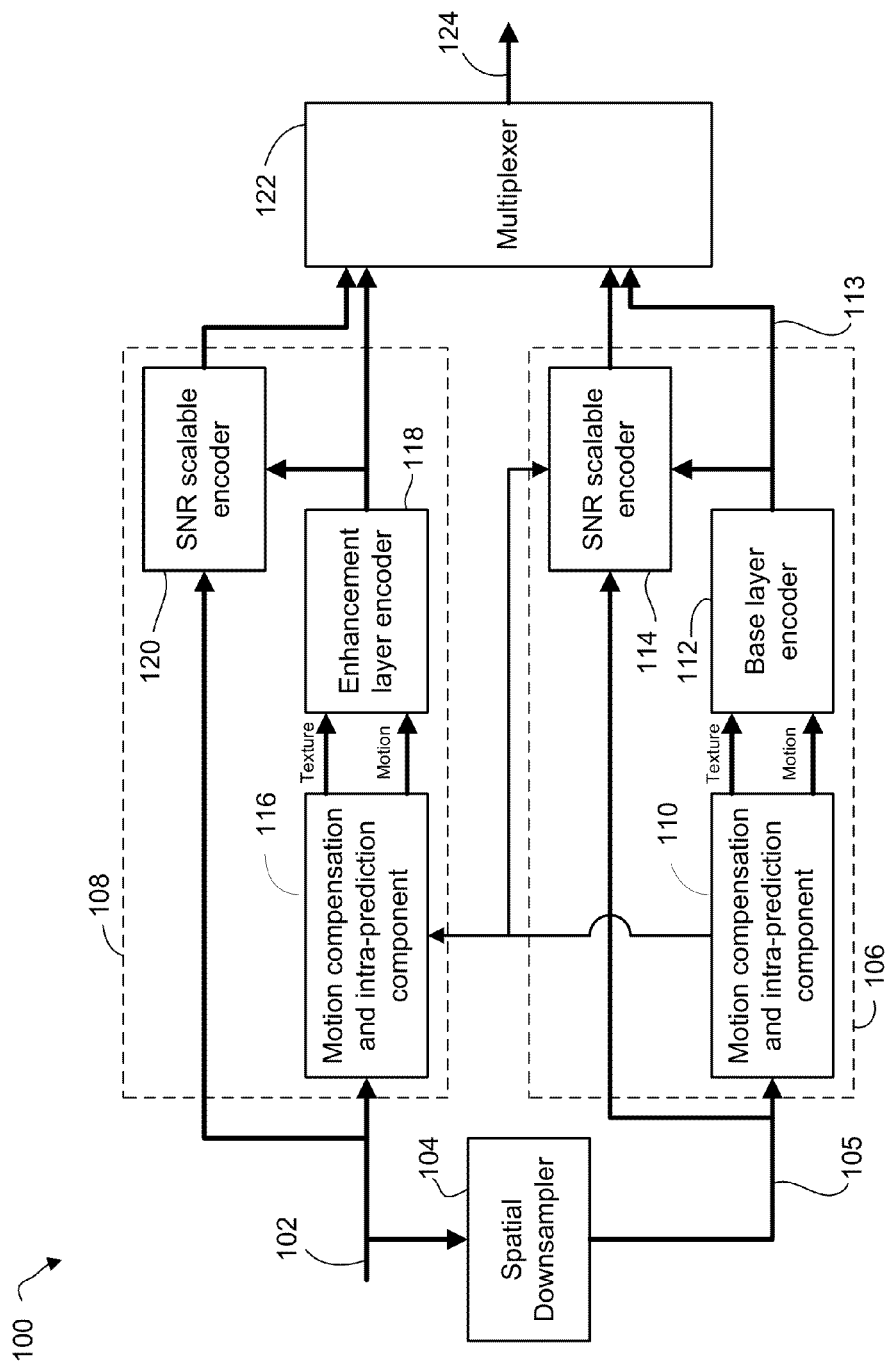
FIG. 3 shows an example architecture for an H.264/SVC compliant encoder.

Reference is now made to FIG. 3, which shows an example architecture for an H.264/SVC compliant encoder 100. The encoder 100 in this embodiment implements spatial scalability and includes a base layer encoding stage 106 and an enhancement layer encoding stage 108. The full-resolution video 102 is downsampled to the base layer resolution by a spatial downsampler 104 to produce the downsampled video, i.e. a "base layer video" 105. The downsampled base layer video 105 is input to the base layer encoding stage 106 while the full-resolution video 102 is input to the enhancement layer encoding stage 108.

The base layer encoding stage 106 includes a motion estimation and intra-prediction component 110 that process the base layer resolution downsampled video 105 in accordance with H.264/AVC to select motion vectors, quantization step size, and partition mode. The motion estimation and intra-prediction component 110 provides the resulting texture (residual) and motion (prediction) information to a base layer encoder 112. The base layer encoder 112 entropy encodes the texture and motion information to produce an H.264/AVC compliant bitstream of encoded video data for the base layer resolution video, i.e. an encoded base layer video 113. This bitstream is input to a multiplexer 122.

In some embodiments the base layer encoding stage 106 also includes an SNR (signal-to-noise ratio) scalable encoder 114 for producing additional enhanced bitstream data for SNR (quality) scaling of the base layer video 105. The SNR scalable encoder 114 receives the bitstream from the base layer encoder 112, the base layer resolution video 105, and data from the motion compensation and intra prediction component 110, such as motion vector and coding mode data. In accordance with H.264/SVC, the SNR scalable encoder 114 may generate 'enhanced' bitstream data that is to be interleaved with the bitstream of encoded base layer data 113 to enable a decoder to enhance the quality of the reconstructed base layer video. For example, in some instances the enhanced bitstream data from the SNR scalable encoder 114 may include refinement of the residual data, so as to realize finer quantization.

In accordance with the H.264/SVC standard, the base layer encoding stage 106 supplies information to the enhancement encoding layer stage 108 to guide the enhancement layer encoding stage 108 in its coding decisions. In particular, the base layer encoding stage 106 may supply details of motion estimation, residual data, etc. The enhancement layer encoding stage 108 uses these details, and in particular uses these details in a motion compensation and intra prediction component 116. The enhancement layer motion compensation and intra prediction component 116 selects motion vectors, coding mode, etc., for encoding the enhancement layer video in accordance with the applicable scalable video coding scheme and produces texture (residual) and motion data. An enhancement encoder 118 receives the texture and motion data and entropy encodes the enhancement layer video. The enhancement layer encoding stage 108 includes an SNR scalable encoder 120 for producing additional enhanced bitstream data for SNR (quality) scaling of the enhancement layer encoding.

As examples, H.264/SVC provides for at least three possible inter-layer prediction enhancements through the use of details obtained from the base layer encoding stage 108. A first example is inter-layer intra-prediction, in which a reconstructed base layer macroblock may be upsampled by the motion compensation and intra prediction component and used as the prediction of a corresponding enhancement layer macroblock. The difference between the actual enhancement layer macroblock and the prediction based on upsampling the base layer block may be encoded as part of the enhancement layer or may not. Another example is inter-layer motion prediction, which uses upscaled partitioning and motion vector data from the base layer as the mode and motion vector data for the enhancement layer and then encodes the residual, i.e. the difference. The third example is inter-layer residual prediction, in which upscaled base layer residuals are used as the prediction of enhancement layer residual data and only the difference is encoded in the enhancement layer. In some cases inter-layer residual prediction and inter-layer motion prediction can be used in concert.

The resulting bitstreams from the base layer encoding stage 106 and the enhancement layer encoding stage 108 are multiplexed together by a multiplexer 122 in accordance with the scalable video coding scheme to produce a scalable bitstream of encoded video 124.

Rate-Distortion Optimization

A compressed inter-predicted macroblock in H.264/AVC is decoded into a set of five components (m, Ref, v, u and q). m is the macroblock mode; also interchangeably called the coding mode or the partition mode. The luminance component of a macroblock can be partitioned into one of the following 7 modes with different partition sizes: 16×16, 8×16, 16×8, 8×8 and sub-partition modes 4×8, 8×4, 4×4. Ref is a vector containing the indices of reference frames, which are previously coded frames used as predictions to each partition. For the purposes of the discussion herein, the number of reference frames is assumed to be 1. In other words, the following discussion presumes motion estimation only on one previously encoded frame; however, it will be appreciated that the more general case may involve multiple frames. v are motion vectors, which are two-dimensional vectors storing the spatial offsets for each partition to its prediction in the reference frames. u refers to motion prediction residuals that are to be used to adjust the data in the reference frame indicated by the motion vector in order to reconstruct the data for the partition. q is the scalar quantization parameter.

In order to achieve the optimal coding performance measured by rate-distortion cost functions, a conventional encoder handles each inter-predicted macroblock with a brute-force time-consuming process. Two computationally expensive processes are employed: considering all candidate motion vectors within a certain range (motion estimation), and considering all possible macroblock modes (coding mode). Coding performance is measured by a rate-distortion cost function, which takes the form:

$$J = D + \lambda R \qquad (1)$$

where distortion D refers to coding errors, and coding rate R is the number of bits spent to represent the coded macroblock. The quantity $\lambda$ is the Lagrangian multiplier, which is a function of the quantization parameter.

In the H.264/AVC reference codec, the cost function is computed in motion estimation and mode decision based on somewhat different quantities. Motion estimation aims at searching for a spatial displacement (a motion vector) between current block and a location in the reference frame that leads to the minimum rate-distortion cost. This process is separately performed for each partition of a macroblock in frame i based on the minimization of:

$$J_{me} = \min_{v_i} \|x_i - p_i\| + \lambda r_{v_i} \qquad (2)$$

over a certain search range. Equation (2) represents the search for a motion vector $v_i$ that minimizes the cost expression. Distortion, in Equation (2), is the sum of differences between original pixels $x_i$ and their predictions $p_i$. The predictions $p_i$ are found based upon the specific block of the reconstructed reference frame pointed at by motion vector $v_i$. The rate term, represents the rate, that is the number of bits in the output bitstream required to encode the motion vectors $v_i$.

It will be noted that Equation (2) does not reflect the real distortion and real rate. In fact, the real distortion comes from the integer rounding from quantization of the transform domain coefficients (TCOEFs) (also called the "residuals"), and the real rate includes both motion rate and texture rate. Those skilled in the art will appreciate that the cost function used in motion estimation is incomplete because residuals are undetermined at this stage. In order for the real rate-distortion cost to be evaluated at the motion estimation stage, it would require that the encoder calculate for each candidate motion vector the residuals, transform and quantize the predicted residuals, and then reconstruct the macroblock, after which the real cost could be measured. Such an implementation is impractical due to the high computational complexity. Therefore, the conventional encoder uses Equation (2) to approximate the real rate-distortion expenses when performing motion vector estimation.

During mode decision, since the residuals are more readily available, the rate-distortion cost function is capable of taking them into account. Accordingly, macroblock mode may be selected based on the minimization of:

$$J_{md} = \min_{v_i} \|x_i - p_i - Z^{-1}Z(x_i - p_i)\| + \lambda(r_{v_i} + r_{Z(x_i - p_i)}) \qquad (3)$$

over all possible inter-coded macroblock modes. Equation (3) reflects the real distortion as shall be decoded in the decoder, which is the accumulated difference between original pixels $x_i$ and their reconstructions over the whole macroblock. The reconstruction is generated based on the macroblock prediction $p_i$ found in the reference frame as adjusted or modified by the reconstructed motion estimation residuals $Z^{-1}Z(x_i-p_i)$, where the residual data is $(x_i-p_i)$, Z is the transformation and quantization process, and $Z^{-1}$ represents the inverse process of Z. Rate cost in this case also represents the real coding bits, which includes not only the motion rate $r_{v_i}$ but also the texture rate $r_{Z(x_i-p_i)}$. The "texture rate" is a term sometimes used to refer to the rate for encoding the quantized transform domain coefficients (TCOEFs).

It will be appreciated that the encoding process employs the above two cost functions at different stages. Equation (2) is first used to approximate the best motion vectors for a specific macroblock mode and Equation (3) is used later in the encoding process to select the optimal macroblock mode. It is easy to infer that if Equation (2) inaccurately locates a suitable motion vector, Equation (3) will be misled in selecting an optimal macroblock mode and this sub-optimal result will eventually impact overall coding performance.

The motion estimation and mode decision processes described above are used in the AVC-compliant encoding of the base layer in H.264/SVC.

The parameters developed in the AVC-compliant encoding of the base layer are then used to guide or steer the encoding of the enhancement layer. To the extent that the base layer encoding is inaccurate or sub-optimal the enhancement layer is also negatively impacted.

The enhancement layer SVC encoding usually fails to meet the performance that might otherwise be achieved through regular AVC-compliant encoding of the enhancement layer on its own, i.e. as a non-scalable video. This may be in part due to inaccurate or sub-optimal encoding of the base layer, upon which some of the enhancement layer encoding may depend. It is also, in part, due to the discrepancy of optimal coding parameters among scalable layers causes by the downsampling operation, and the overhead needed to distinguish different layers.

In the discussion that follows, we assume for the purpose of simplicity that the enhancement layer video is a "full-resolution" video. In the simplest case, this means that it is at the same spatial resolution as the original input video, while the base layer video is a spatially downsampled version. In other cases, the enhancement layer video may also be a spatially downsampled version of the original input video, but not to the same degree as the base layer video. In yet other cases, more than one enhancement layer may be present, in which case the discussion and processes below may be applied to generate residuals using the original input video or a downsampled version at the enhancement layer resolution.

In principle, it may be advantageous to develop mechanisms that force the SVC encoding of the enhancement layer video to be close to what the AVC encoding of the video at the full-resolution would have been. In order to steer the enhancement layer video towards the AVC encoding of the full-resolution video, the base layer encoding may be steered to the AVC encoding of the full-resolution video, since the parameters of the base layer encoding are used to guide the enhancement layer encoding. Thus, in accordance with one aspect of the present application, parameters from the encoding of the full-resolution video are used to influence and guide the encoding of the lower resolution video (the base layer), and, in turn, the parameters from the encoding of the lower resolution video (the base layer) are used in the scalable encoding of the enhancement layer video.

In accordance with one aspect, the base layer encoding is refined by incorporating the full-resolution residuals into the encoding of the base layer video. In particular, the full-resolution residuals may be downsampled to the base layer resolution and may be used as residuals in the distortion and/or rate terms of the rate-distortion optimization expressions used in motion estimation and/or mode decision.

In one example, the full resolution video is passed through an H.264/AVC compliant encoding process and the coding parameters developed in that process are available to the SVC encoder. In particular, residual data is made available. The base layer video is obtained through spatially downsampling the original input video to create a downsampled video. When encoding the downsampled video in the base layer, rather than using the motion estimation cost function of Equation (2), the encoder may use a rate-distortion cost function such as:

$$J_{me'} = \min_{v_i} \|x_i - p_i - DS(U)\| + \lambda(r_{v_i}) \quad (4)$$

In Equation (4), the distortion term includes the downsampled full resolution residuals DS(U). The operator DS( ) indicates spatial downsampling, and the full-resolution residuals are U. It will be noted that Equation (4) will tend to cause the encoder to select a base layer motion vector that gives a prediction $p_i$ that will result in the same residual (downsampled) as was arrived at in the AVC encoding of the equivalent block in the full-resolution video. In other words, the motion vector is selected based on best fit with the downsampled residual. Equation (4) might be modified to include the rate of transmitting the downsampled residuals in the rate term; however, it may also be omitted in some cases since it will be the same for all candidate motion vectors.

In another embodiment, Equation (4) may be modified such that instead of using the downsampled residuals directly in the distortion term, it uses the reconstructed downsampled residuals, given by:

$$Z^{-1}Z(DS(U)) \quad (5)$$

The reconstructed downsampled residuals represent the residual data actually used by the decoder (if the decoder were to be sent the downsampled full-resolution residuals, which is possible in some embodiments). Similarly, the rate term may be modified to represent the cost of transmitting the transformed and quantized downsampled residuals, for example expressed as $r_{Z(DS(U))}$; although, as will Equation (4), this rate term may be omitted in some cases.

The downsampled full-resolution residuals may also be incorporated in to the mode decision, in some embodiments. In a first embodiment, the downsampled residuals may be incorporated into the cost expression for selecting a coding mode. For example, the downsampled residuals may be incorporated into the distortion and rate terms of the mode decision cost expression, such as:

$$J_{md'} = \min_{m_i} \|x_i - p_i - Z^{-1}Z(DS(U))\| + \lambda(r_{v_i} + r_{Z(DS(U))}) \quad (6)$$

Equation (6) provides for the testing of macroblock modes in which the co-located macroblocks of the base layer video and enhancement layer video have similar motion vectors and nearly identical residuals (texture). In this case the downsampled residual is used as the final residual. The motion vector has been selected on the basis of a best fit to the downsampled residuals, and the mode decision is based upon minimizing Equation (6) through selecting the appropriate coding mode $m_i$ that results in a minimization of the expression.

In a second embodiment, the macroblock mode decision focuses upon those with similar motion vectors but slightly different residuals (texture). For this situation, the cost expression for evaluating macroblock coding mode may be the expression of Equation (3), above.

In one embodiment, both macroblock mode cost expressions, Equations (6) and (3), are used to select the coding mode. Each of the expressions may be considered a family of macroblock modes, each family containing the seven different macroblock partitions and sub-partitions.

In some implementations, the downsampled residuals may be used in just the motion estimation stage, as represented by Equation (4), for example. In some implementations, the downsampled residuals may be used in both motion estimation and in mode decision.

Figure 4:
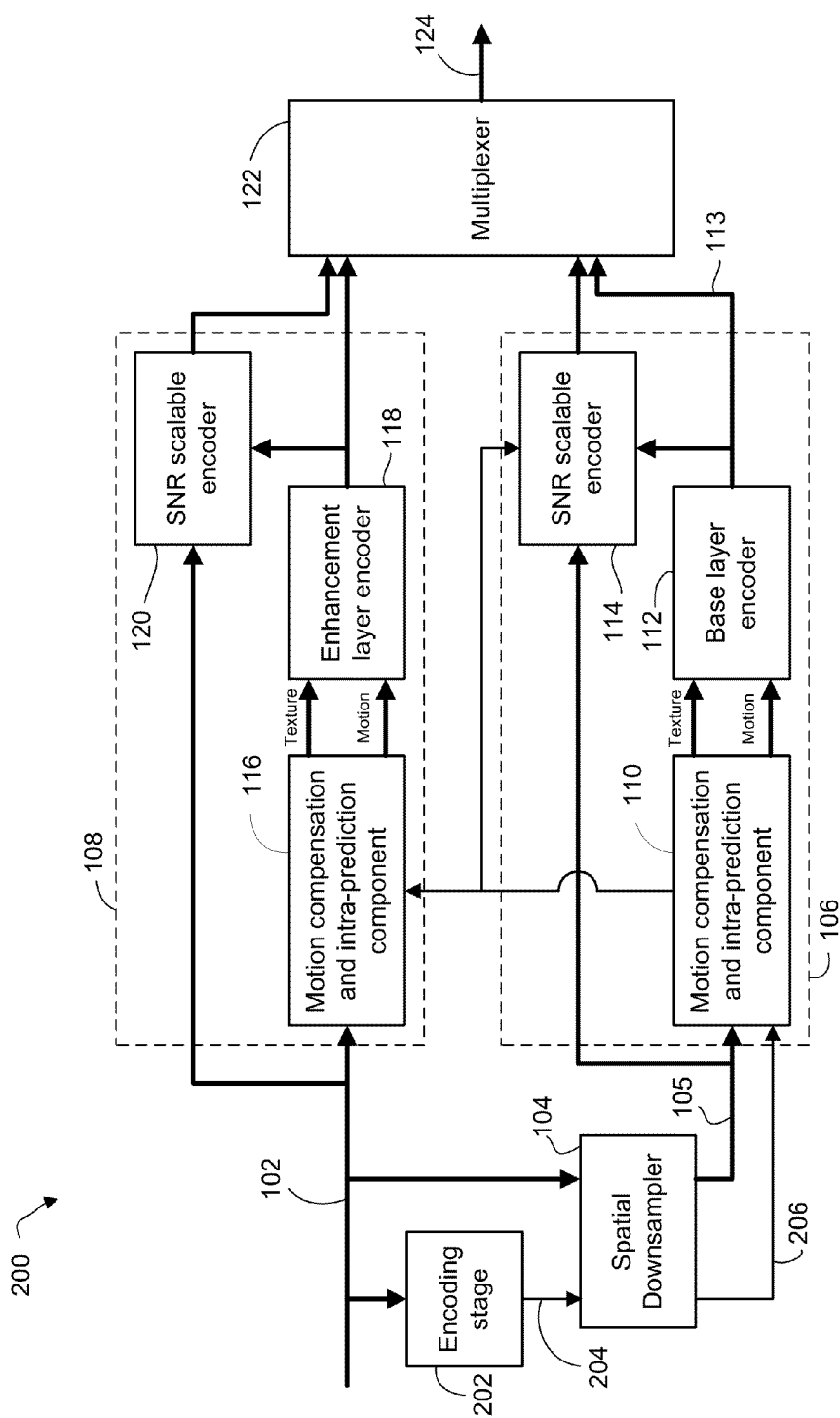
FIG. 4 shows architecture for an encoder in accordance with an aspect of the present application.

Reference is now made to FIG. 4, which shows architecture for an encoder 200 in accordance with an aspect of the present application. The encoder 200 includes the base layer encoding stage 106 and enhancement layer encoding stage 108 described above in connection with FIG. 3; however, it further includes a full-resolution encoding stage 202 for subjecting the full-resolution video to an encoding process in order to generate residual data 204. The residual data 204 is then downsampled by the spatial downsampler 104 to the base layer resolution so as to obtain downsampled residuals 206. The downsampled residuals 206 are supplied to the base layer encoding stage 106, and in particular to the motion compensation and intra-prediction component 110, for use in the base layer encoding process. The full-resolution encoding stage 202 may employ H.264/AVC encoding or any such non-scalable encoding process suitable to the implementation.

Figure 5:
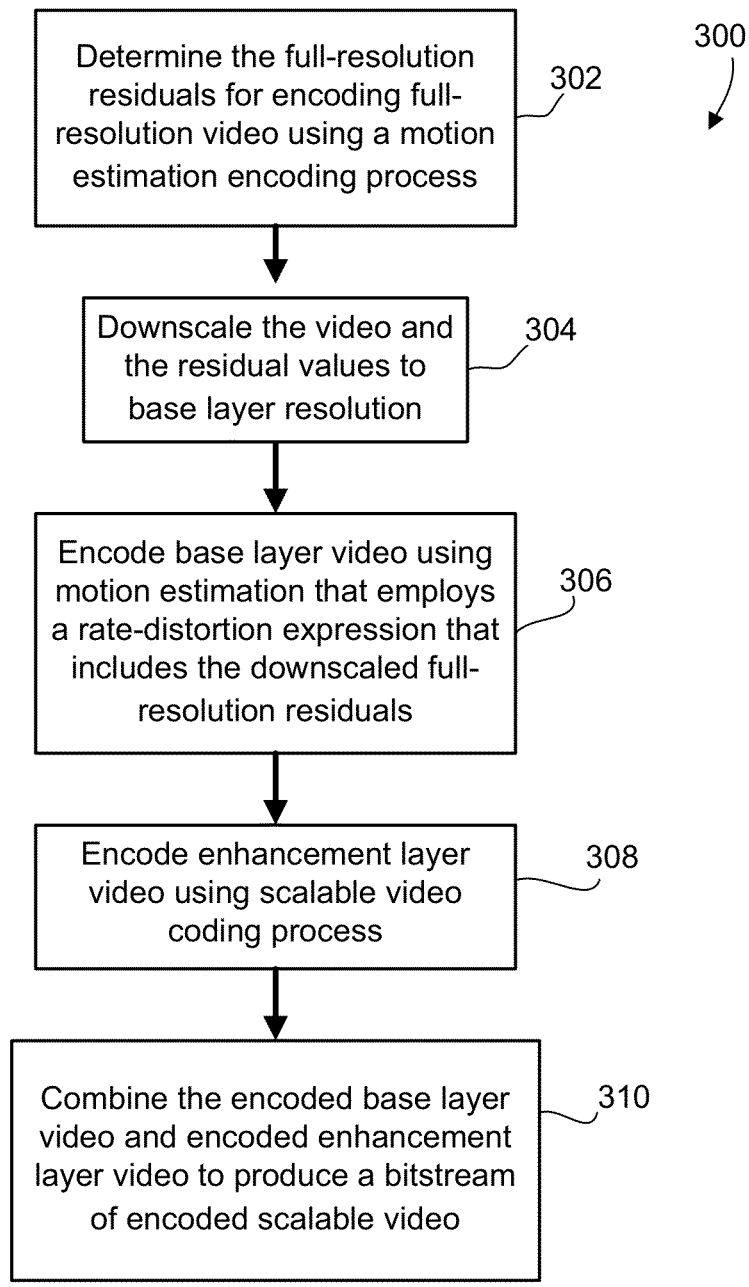
FIG. 5 shows a flowchart of an example method for encoding a scalable coded video.

Reference is now made to FIG. 5, which shows, in flowchart form, a method 300 for encoding an input video to create an encoded video in a scalable video format. The scalable video format includes an encoded first or base layer video at a spatially downscaled resolution, and an encoded second or enhancement layer video at a higher resolution (in some cases, the higher resolution is full-resolution). The method 300 includes an operation 302 of obtaining residual data from the encoding of the video at full-resolution using a motion compensated encoding process. For example, the H.264/AVC encoding process may be used to determine the residual values for the full-resolution video.

In some instances, the encoder may not need to perform the full-resolution encoding of operation 302 itself In some instances, the full-resolution residual data may be made available to the encoder. For example, in the context of transcoding, the original video may have been previously encoded such that the decoder portion of the transcoder will have available the reconstructed residual values from the decoded video. In this situation, the encoder portion of the transcoder may use the reconstructed residual values as the full-resolution residual values instead of performing the motion compensated encoding process upon the full-resolution reconstructed decoded video. The term "full-resolution residual values" is used herein to cover both possibilities of calculated residuals and reconstructed residuals. It will be understood that transcoding is the process of decoding an encoded video to create a reconstructed video and then encoding the reconstructed video to create an encoded reconstructed video. In one embodiment, a transcoder may be configured to decode an encoded full-resolution video so as to convert it into a scalable video format.

In operation 304, the full-resolution residual values are spatially downsampled to the base layer resolution. Then in operation 306, the base layer encoding stage encodes the base layer resolution video. The encoding of the base layer video in operation 306 includes performing motion estimation using a rate-distortion expression that includes the downsampled residuals. The rate-distortion expression may include the full-resolution residuals as in the distortion term and/or in the rate term. Equation (4) may be used in some embodiments. It will be appreciated that the use of the full-resolution residual values in the rate-distortion expression for motion estimation is akin to seeking motion vectors that best fit the downscaled full-resolution residuals. In this example embodiment, the base layer video may be encoded using the actual residuals that result from the difference between the original blocks and predicted blocks from motion compensation. According, coding mode decisions may take into account the distortion and rate cost associated with the actual residuals, as reflected for example in Equation (3).

In operation 308, having performed the motion estimation and mode selection at the base layer, the base layer supplies details of its coding decisions, and in particular the base layer residuals, to the enhancement layer. The enhancement layer video is encoded in operation 308, in part in reliance upon the coding decision made at the base layer, using a scalable video coding process. The result is a bitstream of encoded enhancement layer data.

In operation 310 the encoded base layer bitstream and the encoded enhancement layer bitstream are combined to produce a bitstream of scalable encoded video.

Figure 6:
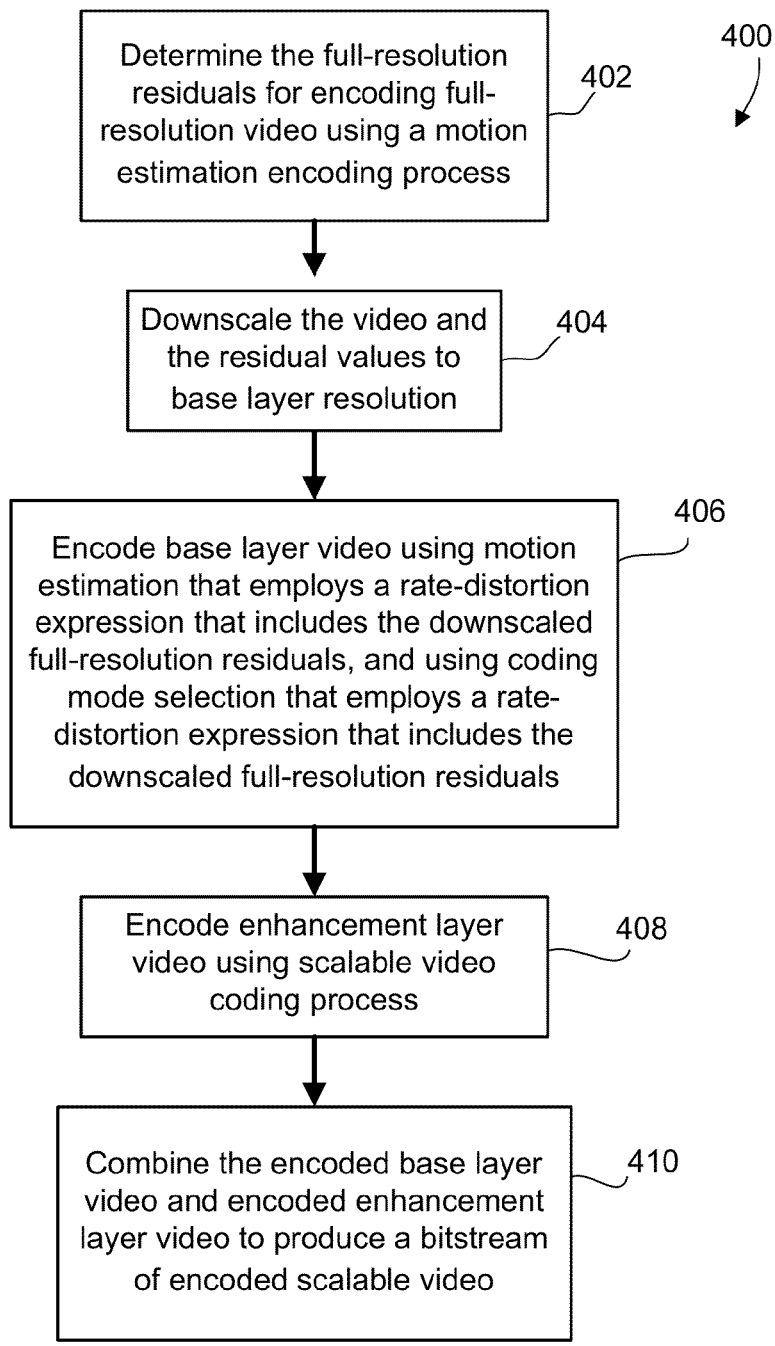
FIG. 6 shows a flowchart of another example method for encoding a scalable coded video.

Reference is now made to FIG. 6, which shows a flowchart of another example method 400 for encoding a video in a scalable video format. In this example method 400 operations 402 and 404 are similar to operations 302 and 304 outlined above. In operation 406, the base layer video is encoded. As noted above in connection with FIG. 5 and operation 306, the base layer encoding includes performing motion estimation using a rate-distortion expression that includes the downsampled full-resolution residuals. Operation 406 further includes using the downsampled full-resolution residuals in a rate-distortion expression for selecting a coding mode. That is, instead of using the actual residuals that result from the difference between original blocks and predicted blocks from motion compensation, the encoder uses the downscaled full-resolution residuals as the texture for encoding. The rate-distortion expression may be, for example, the expression shown in Equation (6).

Operations 408 and 410 are similar to operations 308 and 310 outlined above.

In some embodiments, the encoder may evaluate both Equation (3) and Equation (6) in selecting a coding mode. In other words, the encoder may evaluate the rate-distortion costs associated with both using the actual residual and the downscaled full-resolution residuals in selecting from amongst the seven possible coding modes. The lowest cost option is then used as the basis for the coding mode decision for that block of the base layer encoding, and the texture used for encoding that block follows the result.

Figure 7:
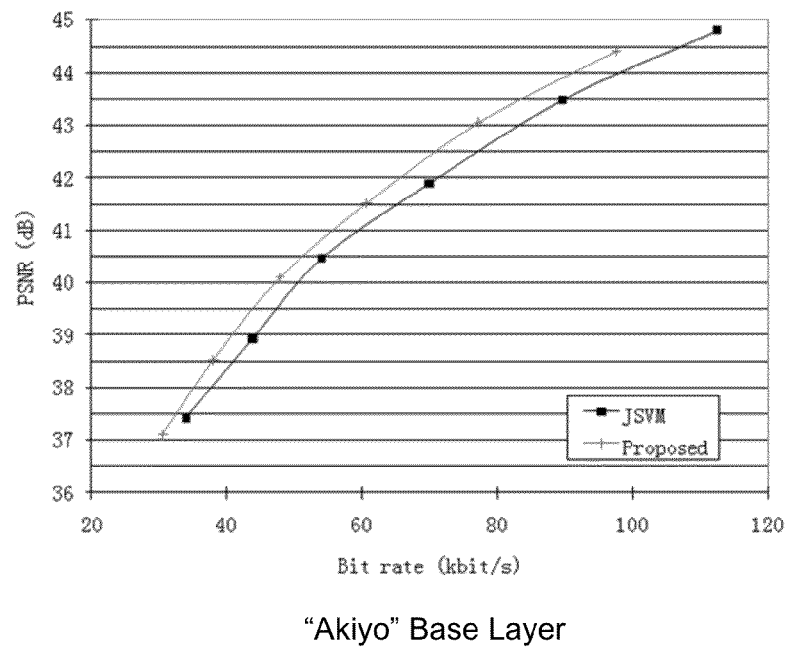
FIGS. 7 and 8 shows graphs illustrating the performance of an embodiment of the described scalable coding process versus the JSVM 9.15 standard coder for the video sequences "Akiyo" and "Forman", respectively.
Figure 7:
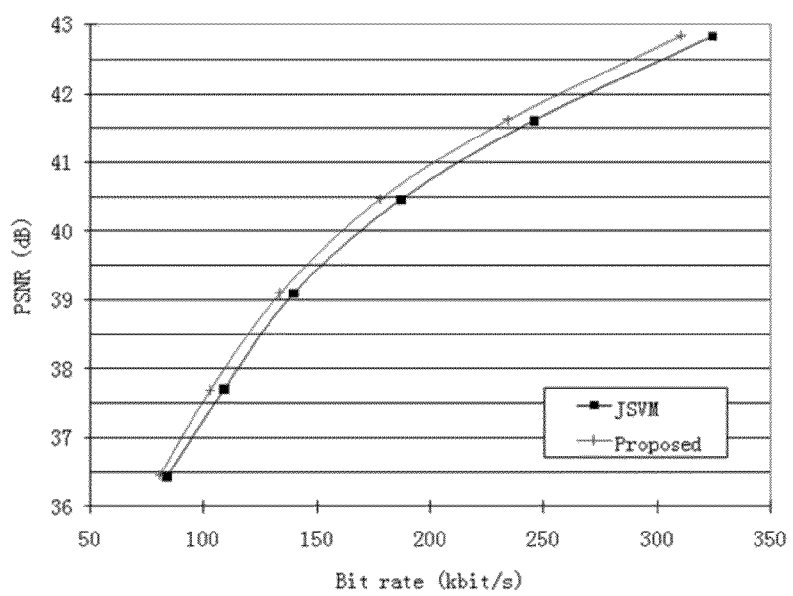
Figure 8:
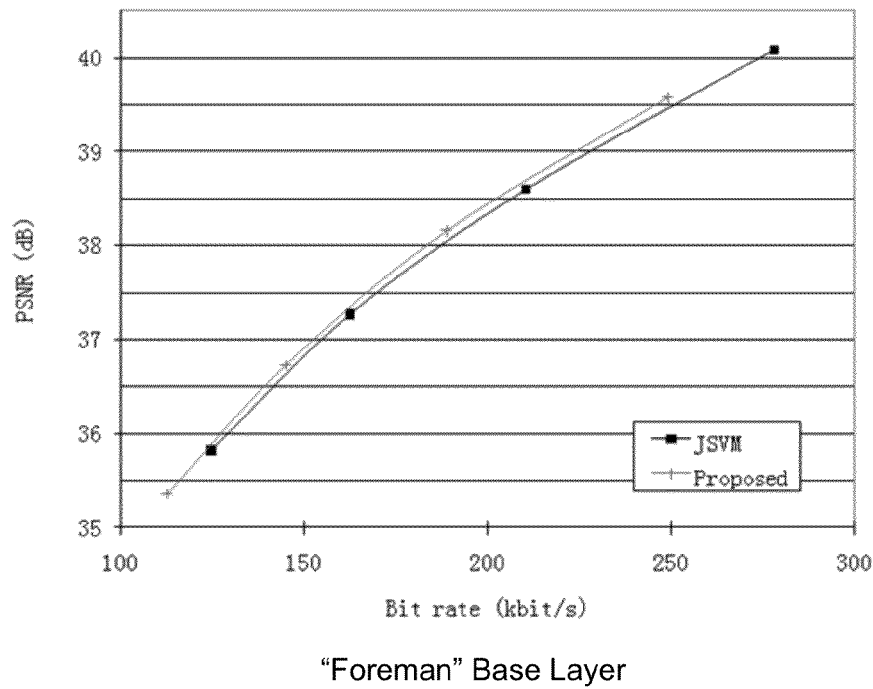
Figure 8:
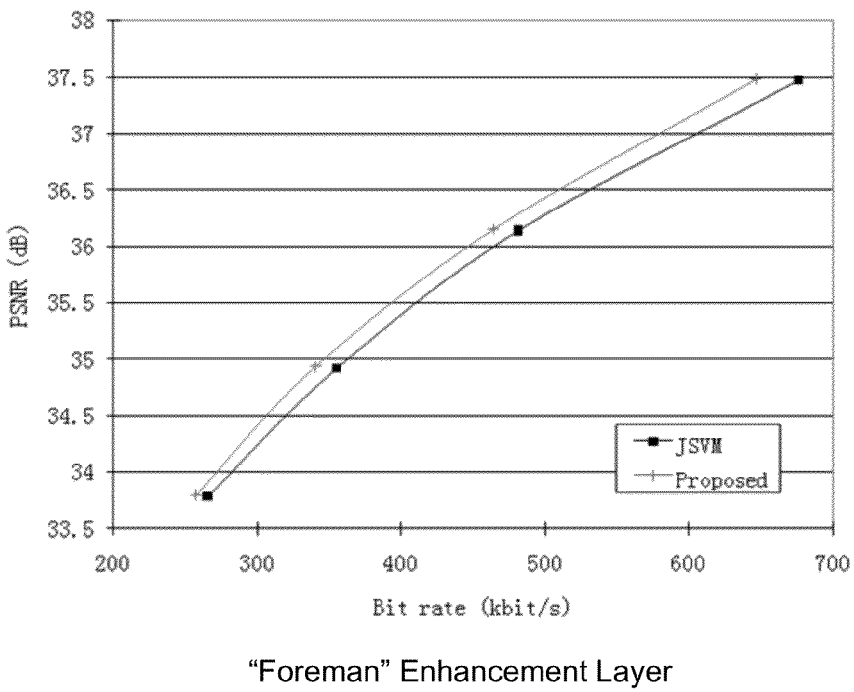

The process described herein has been experimentally tested, using a coding mode selection that evaluated both Equation (3) and Equation (6). CIF video sequences "Foreman" and "Akiyo" were used in the experiment. In the experiment, the base layer video was downscaled to QCIF size, whilst the enhancement layer video was at CIF size—i.e. a dyadic spatial downsampling situation. The experiment was implemented in the JSVM 9.15 reference codec. FIGS. 7 and 8 shows graphs of the results for the "Akiyo" and "Foreman" sequences, respectfully. Each Figure shows a graph of the performance of the base layer video and a graph of the performance of the enhancement layer video. Each of the graphs includes a plot of the results from the JSVM 9.15 standard codec and the proposed modifications. It will be noted that the proposed method outperforms the JSVM standard codec in both the base layer and the enhancement layer, and in no case performs worse. The performance gain is more obvious in those sequences with less motion.

Figure 9:
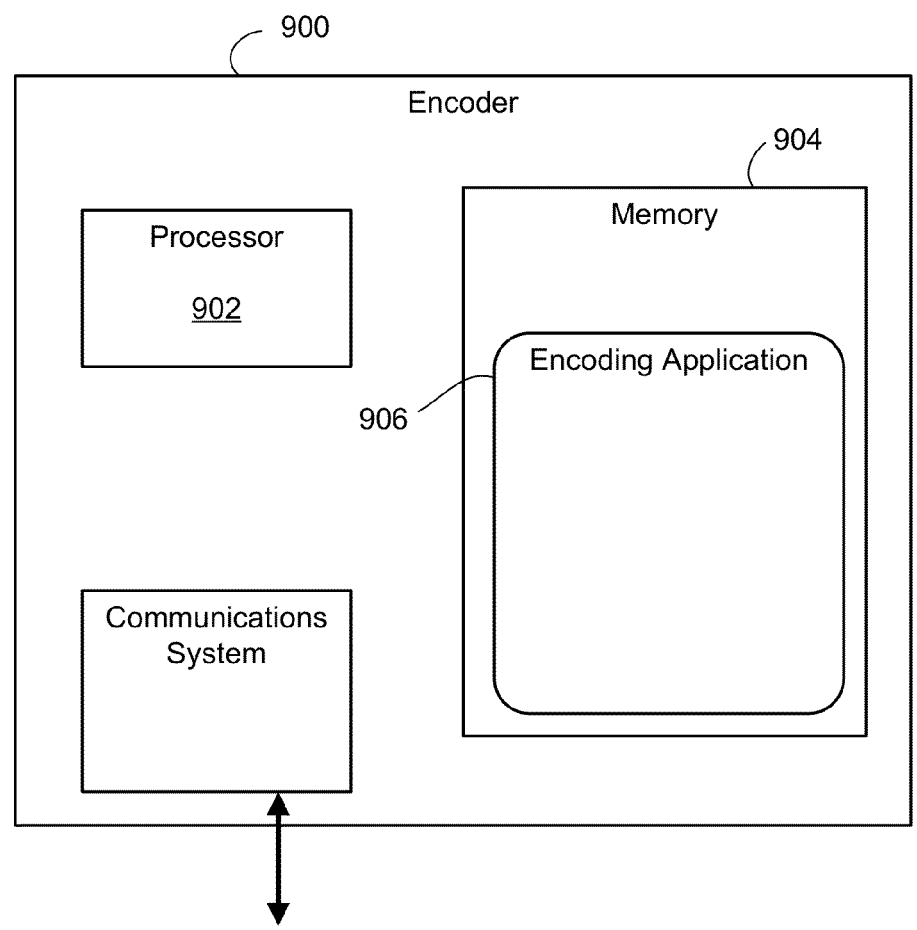
FIG. 9 shows a block diagram of an example encoder.

Reference is now made to FIG. 9, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform steps or operations such as those described herein. For example, the encoding application 906 may encode and output bitstreams encoded in accordance with the processes described herein. The input data points may relate to audio, images, video, or other data that may be subject of a lossy data compression scheme. It will be understood that the encoding application 906 may be stored in on a computer readable medium, such as a compact disc, flash memory device, random access memory, hard drive, etc.

Figure 10:
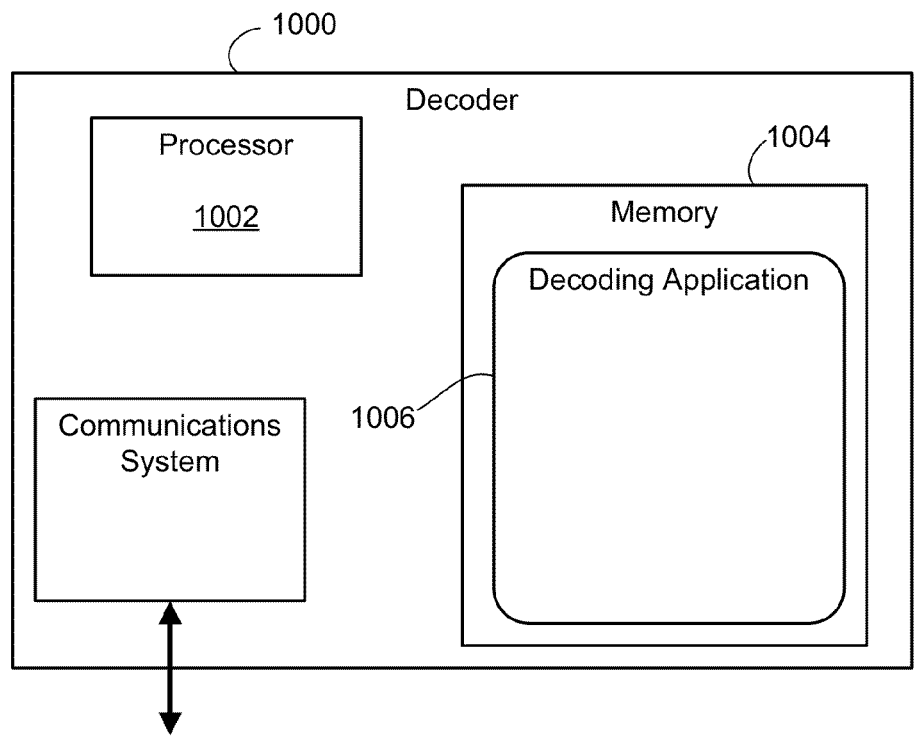
FIG. 10 shows a block diagram of an example decoder.

Reference is now also made to FIG. 10, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform steps or operations such as those described herein. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of encoding an input video to create an encoded video in a scalable video format, wherein the input video includes full-resolution frames, wherein the scalable video format includes an encoded base layer video at a spatially downsampled base layer resolution and an encoded enhancement layer video at a higher resolution, the method comprising:
    obtaining full-resolution residual values for the full-resolution frames;
    spatially downsampling the full-resolution residual values to the base layer resolution to generate downsampled residuals;
    spatially downsampling the input video to create a base layer video at the base layer resolution;
    encoding the base layer video, using a motion estimation process that employs a motion estimation rate-distortion optimization expression, wherein the motion estimation rate-distortion optimization expression includes the downsampled residuals, to produce the encoded base layer video;
    encoding an enhancement layer video at the higher resolution, using a scalable video coding process, to produce the encoded enhancement layer video; and
    combining the encoded base layer video and encoded enhancement layer video to produce a bitstream of encoded video.

2. The method claimed in claim 1, wherein encoding the base layer video includes using a mode decision rate-distortion optimization expression that includes the downsampled residuals.

3. The method claimed in claim 2, wherein the mode decision rate-distortion optimization expression comprises:

$$J_{md'} = \min_{m_i} \|x_i - p_i - Z^{-1}Z(DS(U))\| + \lambda(r_{v_i})$$

wherein $J_{md'}$ is the rate-distortion cost, $m_i$ is the coding mode, $x_i$ is an original pixel block, $p_i$ is a predicted pixel block, $DS(U)$ is the downsampled residuals, $Z^{-1}Z(\ )$ is a transform, quantization, inverse transform and dequantization operation, $r_{v_i}$ is a rate for transmitting the motion vector $v_i$, and $\lambda$ is a Lagrangian factor.

4. The method claimed in claim 1, wherein encoding the base layer video includes using a mode decision rate-distortion optimization expression that includes actual residuals, wherein the actual residuals are determined based upon the difference between an original block of pixels and a predicted block of pixels.

5. The method claimed in claim 1, wherein encoding the base layer video includes selecting a macroblock mode by using at least two mode decision rate-distortion expressions and selecting a lowest cost mode therefrom, and wherein the two mode decision rate-distortion expressions include a first expression that includes the downsampled residuals, and a second expression that includes actual residuals, wherein the actual residuals are determined based upon the difference between an original block of pixels and a predicted block of pixels.

6. The method claimed in claim 5, wherein the first expression comprises:

$$J_{md'} = \min_{m_i} \|x_i - p_i - Z^{-1}Z(DS(U))\| + \lambda(r_{v_i})$$

wherein $J_{md'}$ is the rate-distortion cost, $m_i$ is the coding mode, $x_i$ is an original pixel block, $p_i$ is a predicted pixel block, $DS(U)$ is the downsampled residuals, $Z^{-1}Z(\ )$ is a transform, quantization, inverse transform and dequantization operation, $r_{v_i}$ is a rate for transmitting the motion vector $v_i$, and $\lambda$ is a Lagrangian factor.

7. The method claimed in claim 1, wherein the motion estimation rate-distortion optimization expression includes a distortion term and the distortion term comprises the difference between original pixel values and predicted pixel values given by a motion vector when adjusted by the downsampled residuals.

8. The method claimed in claim 7, wherein the motion estimation rate-distortion optimization expression includes a rate term and wherein and the rate term includes a rate value for transmitting the downsampled residuals.

9. The method claimed in claim 8, wherein the rate value for transmitting the downsampled residuals is a rate cost for transmitting the downsampled residuals after they are transformed, quantized and entropy encoded.

10. The method claimed in claim 7, wherein the motion estimation rate-distortion optimization expression comprises:

$$J_{me'} = \min_{v_i} \|x_i - p_i - DS(U)\| + \lambda(r_{v_i})$$

wherein $J_{me'}$ is the rate-distortion cost, $v_i$ is a motion vector, $x_i$ are the original pixel values, $p_i$ are the predicted pixel values, $DS(U)$ are the downsampled residuals, $r_{v_i}$ is a rate for transmitting the motion vector $v_i$, and $\lambda$ is a Lagrangian factor.

11. The method claimed in claim 1, wherein obtaining full-resolution residual values comprises calculating the full-resolution residual values for the full-resolution frames using a motion compensation process.

12. The method claimed in claim 1, wherein obtaining full-resolution residual values comprises obtaining the full-resolution residual values through a motion compensated decoding process.

13. An encoder for encoding an input video to create an encoded video in a scalable video format, wherein the input video includes full-resolution frames, wherein the scalable video format includes an encoded base layer video at a spatially downsampled base layer resolution and an encoded enhancement layer video at a higher resolution, the encoder comprising:
- a processor;
- a memory;
- a communications system for outputting the encoded video; and
- an encoding application stored in memory and containing instructions which when executed by the processor configure the processor to
  - obtain full-resolution residual values for the full-resolution frames;
  - spatially downsample the full-resolution residual values to the base layer resolution to generate downsampled residuals;
  - spatially downsample the input video to create a base layer video at the base layer resolution;
  - encode the base layer video, using a motion estimation process that employs a motion estimation rate-distortion optimization expression, wherein the motion estimation rate-distortion optimization expression includes the downsampled residuals, to produce the encoded base layer video;
  - encode an enhancement layer video at the higher resolution, using a scalable video coding process, to produce the encoded enhancement layer video; and
  - combine the encoded base layer video and encoded enhancement layer video to produce a bitstream of encoded video.

14. A non-transitory computer-readable medium having stored thereon computer-executable instructions for encoding an input video to create an encoded video in a scalable video format, wherein the input video includes full-resolution frames, wherein the scalable video format includes an encoded base layer video at a spatially downsampled base layer resolution and an encoded enhancement layer video at a higher resolution, and wherein the computer-executable instructions, when executed by a processor, configure the processor to
- obtain full-resolution residual values for the full-resolution frames;
- spatially downsample the full-resolution residual values to the base layer resolution to generate downsampled residuals;
- spatially downsample the input video to create a base layer video at the base layer resolution;
- encode the base layer video, using a motion estimation process that employs a motion estimation rate-distortion optimization expression, wherein the motion estimation rate-distortion optimization expression includes the downsampled residuals, to produce the encoded base layer video;
- encode an enhancement layer video at the higher resolution, using a scalable video coding process, to produce the encoded enhancement layer video; and
- combine the encoded base layer video and encoded enhancement layer video to produce a bitstream of encoded video.

15. A non-transitory computer-readable medium having stored thereon the bitstream of encoded video produced by the method claimed in claim 1.

* * * * *